Figure 1:
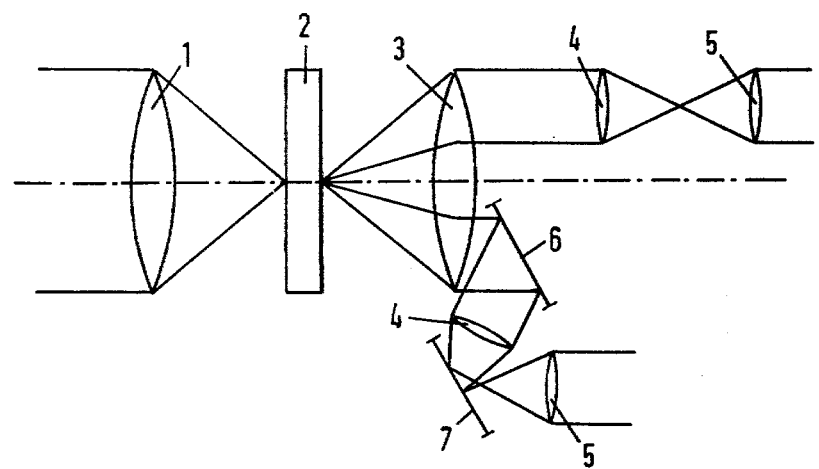

United States Patent [19]

Versteeg et al.

[11] 4,266,129
[45] May 5, 1981

[54] DEVICE FOR VIEWING RESIDUAL LIGHT IN THE VISIBLE AND THE NEAR INFRARED SPECTRUM

[75] Inventors: Frits J. Versteeg, Rotterdam; Abraham Groeneweg, Maassluis, both of Netherlands

[73] Assignee: N.V. Optische Industrie "De Oude Delft", Delft, Netherlands

[21] Appl. No.: 33,836

[22] Filed: Apr. 27, 1979

[30] Foreign Application Priority Data

May 9, 1978 [NL] Netherlands .......................... 7804990

[51] Int. Cl.³ ............................................. H01J 31/49
[52] U.S. Cl. .................................... 250/330; 250/333
[58] Field of Search ................... 250/213 R, 330, 333, 250/334

[56] References Cited

U.S. PATENT DOCUMENTS 3,454,773  7/1969  Bulthius et al. ...................... 250/333
4,020,376  4/1977  Bosserman et al. ............. 250/213 R Primary Examiner—Alfred E. Smith
Assistant Examiner—Janice A. Howell
Attorney, Agent, or Firm—O'Brien & Marks

[57] ABSTRACT

A device for binocular viewing of residual light in the visible and the near infrared spectrum, comprising an optical input system, at least one singular image intensifier of the non-inverting type, a collimator, two ocular paths parallel with the axis of the device, and an optical output system associated with each ocular path, which is arranged so that a single image inversion is performed in each ocular path.

5 Claims, 2 Drawing Figures

U.S. Patent

May 5, 1981

4,266,129

DEVICE FOR VIEWING RESIDUAL LIGHT IN THE VISIBLE AND THE NEAR INFRARED SPECTRUM

The invention relates to a device for binocular viewing of residual light in the visible and the near infrared spectrum, which device comprises an optical input system, at least one image intensifier, a collimator, two ocular paths parallel with the axis of the device, and an optical output system associated with each ocular path.

Such a device is used, for example, as a passive binocular night glass.

It is an object of the invention to design such a device to have a short length, a very low weight and a limited height, and to have its centre of gravity located optimally near to the ocular end of the device, so that the device may be worn as a pair of goggles.

To achieve this object, in accordance with the invention a singular image intensifier of the non-inverting type is present and each optical output system is arranged so that a single image inversion is performed in each ocular path.

In accordance with the invention, a device of extremely short length is achieved if the image intensifier comprises an intensifier tube of the so-called MCP proximity focus type, which tube is conspicuous for its slight length.

For reducing the total length of the device even more, in accordance with the invention reflector surfaces may be mounted in each ocular path between the collimator and an object lens disposed in the respective path and between this object lens and an eyepiece disposed in this path, which reflector surfaces are mounted in parallel with each other so that no image inversion is caused thereby and the beam emanating from each eyepiece is parallel with the axis of the device.

To limit the height of the device, in accordance with the invention means may be provided for permitting an adjustment of the distance between the ocular paths so that a constant distance is maintained between the axis of the collimator and the plane through the optical axes of the eyepiece.

Figure 2:
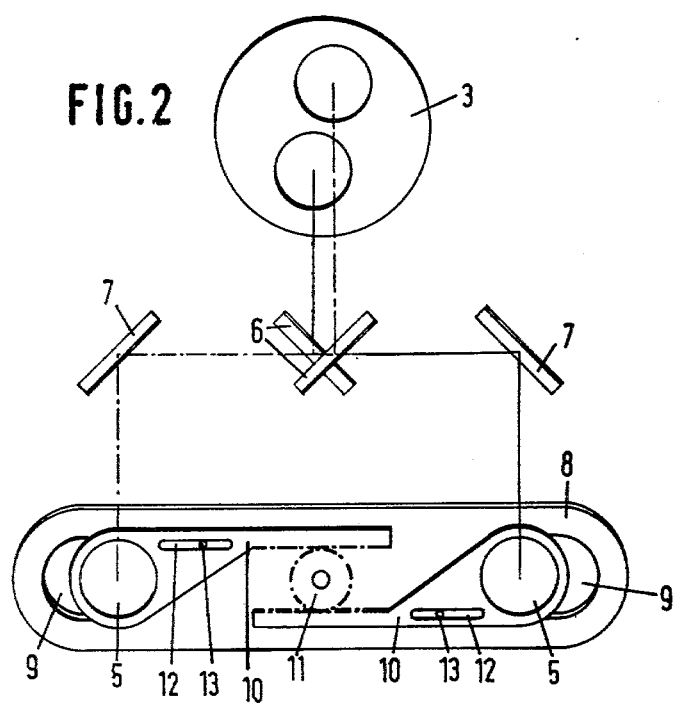

The invention will be described in greater detail hereinafter with reference to the accompanying drawings, in which:

FIG. 1 shows schematically the arrangement of a device according to the invention, in which the upper half shows the optical principle of the invention in so far as image formation and inversion are concerned, and the lower half shows an embodiment by means whereof a favourable weight, a slight length and height and a proper location of the centre of gravity are achieved; and FIG. 2 shows an embodiment of the means for adjusting the distance between the exit pupils.

As appears from FIG. 1, residual light incident on the device is projected by the lens 1 constituting the optical input system onto an image intensifier 2. The light from image intensifier 2 impinges upon a collimator 3 from which a parallel light beam emanates that can be viewed with an optical output system comprising an object lens 4 and an eyepiece 5.

As stated above, the upper part of FIG. 1 shows the optical principle of the invention in so far as image formation and inversion are concerned and it will be clear that the light emanating from collimator 3 can be viewed through two separate ocular paths each including an optical output system 4, 5. It is observed that the exit pupil of the device should be larger than the pupil of the eye. The aperture of the collimator 3 should be selected so that the exit pupil of the device is fully filled with light. As a result thereof, the combination of collimator 3 and optical output system 4, 5 does not produce luminance losses relative to viewing the intensifier tube with the naked eye or a singular magnifying glass, irrespective of the relative transverse displacement of the axes of collimator and optical output system. Therefore, the distance between the axes of the optical output systems, i.e. the interpupillary distance, may be varied without luminance losses or reduction of the image quality. In view of the fact that the device according to the invention is intended for wearing as a pair of goggles, it is preferred to make such a variation possible.

A realization thereof is shown in FIG. 2.

As appears from this figure, a plate 8 is mounted on the housing (not shown), which plate includes two elongated openings each associated with a rack 10.

As shown in the figure, the racks 10 mesh with a toothed wheel 11 mounted on plate 8 and hence on the housing of the device. Wheel 11 has an axis of rotation parallel with the axis of the device. Each rack further includes an elongated aperture 12 coacting with a pin 13 mounted on the plate 8 and hence on the housing of the device. This arrangement of the racks permits these racks to be displaced in parallel with each other through equal distances in inward or outward direction. During such a displacement, the eyepiece 5 of each optical output system associated with each ocular path is likewise displaced in inward or outward direction.

Consequently, in this manner it is possible to vary the interpupillary distance.

During such a displacement, the other components of the optical output system are similarly displaced, which means that in each ocular path the mirror systems 6 and 7 and the object lens 4 disposed therebetween (not shown in FIG. 2) are likewise displaced in inward or outward direction.

The arrangement of the optical output systems is selected so that the refelector surfaces 6 and 7 and the object lens 4 (not shown in FIG. 2) in each ocular path perform a corresponding displacement, the beams emanating from the collimator 3 being displaced in parallel with each other over the collimator surface above and below, respectively, the collimator axis, as shown in FIG. 2.

In this manner an optimal utilization of the collimator surface is achieved. Moreover, as will be readily clear, an adjustment by means of such a structure is extremely simple, reliable and accurate.

It will be clear that the above embodiment of the adjusting means is described only by way of example and that these adjusting means may be arranged in several other manners while maintaning the linear displacement of the exit pupils with the corresponding linear displacement of the beams emanating from the collimator over the surface thereof in a manner described above.

As another object of the invention is to shorten the length of the device and to have the centre of gravity of the device located as near to the rear as possible, it is preferred so to speak to fold up each ocular path. This is shown in the lower half of FIG. 1.

The parallel beam emanating from collimator 3 impinges upon a first reflector surface 6 which projects this incident light through the object lens 4 upon a second reflector surface 7. The light reflected from this mirror surface 7 can reach the eye of the viewer through the eyepiece 5. It will be clear that by the "folded" structure the length of the respective ocular path is drastically reduced, which results in a reduction of the total length of the device and in a displacement of its centre of gravity towards the ocular end thereof.

Although in FIG. 1 the reflector surfaces 6 and 7 are shown as flat mirrors, it is possible to use prisms instead.

In the arrangement described above, the image intensifier tube 2 is a readily exhangeable module preferably including an integrated high voltage unit. In view of the contemplated slight length of the device and, particularly, the slight length of the tube itself, this high voltage unit may, in principle, be mounted as a cylinder around the object lens or the collimator. In connection with the desired location of the centre of gravity of the device it is preferred to mount the high voltage unit around the collimator.

It will be clear, moreover, that the entire device may be constructed in modular form so as to permit a simple assembling of the device and a stepwise adjusting of the different modules. For example, it is then possible to first ensure that the two ocular paths extend parallel with the axis of the device and to subsequently, and fully independently thereof, adjust the collimator 3.

We claim:

1. A device for binocular viewing of residual light in the visible and the near infrared spectrum, said device comprising an optical input system, image intensifier means, a collimator, two ocular paths, and an optical output system associated with each ocular path, said image intensifier means being one singular image intensifier of the non-inverting type, and each optical output system being arranged so that a single image inversion is performed in each ocular path.

2. A device according to claim 1, wherein said image intensifier comprises an intensifier tube of the MCP proximity focus type.

3. A device according to claim 1, wherein each of said optical output systems includes a pair of reflector surfaces, an object lens, and an eyepiece mounted in each ocular path, one of each pair of reflector surfaces being mounted between the collimator and the object lens disposed in the respective path and the other of each pair of reflector surfaces being mounted between the object lens and the eyepiece disposed in the respective path, said reflector surfaces being mounted in parallel with each other so that no image inversion is caused thereby and the beam emanating from each eyepiece is parallel with the axis of the device.

4. A device according to claim 1, including means for permitting an adjustment of the distance between the ocular paths so that a constant distance is maintained between the axis of the collimator and a plane through optical axes of the ocular paths.

5. A device according to claim 4, wherein said adjusting means includes a toothed wheel mounted for rotation on the housing of the device, and two racks mounted in a plane normal to the axis of the device for movement in opposite, parallel horizontal directions relative to each other, the central axis of said wheel being parallel with the axis of the device, said wheel meshing with said two racks, said optical output systems being mounted to receive respective beams from the collimator above and below, respectively, the collimator axis, said racks being coupled to each optical output system so that a change in the distance between the optical paths is accompanied with a displacement parallel thereto of the beams received by the optical output systems from the collimator.

* * * * *